Aug. 13, 1963

W. R. HALL 3,100,747

FILTERING SYSTEMS

Filed Jan. 6, 1958

INVENTOR
William R. Hall

BY *[signature]*

ATTORNEY

Aug. 13, 1963

W. R. HALL 3,100,747

FILTERING SYSTEMS

Filed Jan. 6, 1958

INVENTOR
William R. Hall

BY

ATTORNEY

United States Patent Office 3,100,747
Patented Aug. 13, 1963

3,100,747
FILTERING SYSTEMS
William R. Hall, 2416 Colcord St., Waco, Tex.
Filed Jan. 6, 1958, Ser. No. 707,178
8 Claims. (Cl. 210—167)

This invention relates to filtering systems and filters used in connection therewith and more particularly to filtering systems and filters used to remove impurities from cooking liquids, such as fats, oils and greases, utilized with cooking apparatus.

An object of the invention is to provide a new and improved system for filtering all debris from cooking liquids used in deep fryer kettles.

Another object of the invention is to provide a filtering system for circulating cooking liquids from a deep fryer kettle to a filter and back to the kettle while the deep fryer kettle is in operation.

Still another object of the invention is to provide a filtering system for filtering cooking liquids from a deep fryer kettle through the filter and back to the kettle which separates the food particles or debris from the cooking oil and removes it from the cooking liquids so that the cooking liquids thenceforth no longer come into contact with such filtered out debris.

A further object is to provide a filtering system which is continuously operable to remove food debris or particles from cooking liquids of a deep fryer kettle whereby such food debris or particles once filtered out no longer come in contact with the hot cooking liquids which would otherwise absorb disagreeable tastes and odors from the food debris.

A still further object of the invention is to provide a filtering system for the cooking liquids of a deep fryer kettle which draws the hot cooking liquids from the bottom of the kettle into a closed filter container when the pressure therein is reduced by a pump.

A still further object of the invention is to provide a filtering system wherein the filter container is provided with a perforate receiving plate or separator through which the cooking liquids drawn from the fryer kettle passes, the separator separating food particles and debris from the oil.

Another object is to provide a filter system wherein the separator is disposed about a filter element whereby the debris is separated from the cooking liquids before passing through the filter element whereby clogging of the filter element by such debris is precluded.

Another object is to provide a filter system wherein the debris separated from the cooking liquids is transported to a debris receptacle whereby the debris is removed from any further contact with the hot cooking liquid as they continue to circulate through the filter container.

A further object is to provide a filter system wherein the pump for reducing the pressure within the filter container also pumps the cooking liquids from the container back into the fryer kettle.

Still another object is to provide a filter system wherein a drain valve is provided between the pump and the fryer kettle whereby when the drain valve is open, operation of the pump will cause all cooking liquids to be drawn from the fryer kettle, moved through the filter container and filtered therein and then expelled through the drain valve to suitable receptacles for refrigerated storage leaving both the deep fryer kettle and the filter container free of all cooking liquids.

Still another object is to provide a new and improved filter for cooking liquids having a perforate receiving or separator plate upon which the cooking liquids are deposited upon withdrawal from the fryer kettle and having debris removing means movable over the receiving plate to move the debris into a debris receiving receptacle, the debris receiving receptacle being disposed out of the path of flow of the cooking liquids through the filter container whereby the food particles and debris once separated from the cooking liquids no longer come into contact with the hot cooking liquids as they circulate through the filter.

A still further object of the invention is to provide a filter for cooking liquids or the like having a container provided with a receiving or separator plate adjacent its upper portion, an inlet conduit disposed above the receiving plate for directing the cooking liquids to be filtered onto the receiving plate and rotatable blades for wiping the perforate receiving plate to transport food particles and debris from the receiving plate outwardly into a debris receptacle disposed in the container adjacent the outer walls thereof, the cooking liquids flowing through the perforations in the receiving plate flowing through a filter element disposed below the receiving plate and then to an outlet conduit from the container.

A still further object of the invention is to provide a new and improved filter having an inlet conduit at its upper end and an outward conduit at its lower end provided with a pump for pumping air and liquids from the interior of the container whereby the reduction of the pressure within the container caused by operation of the pump draws the cooking liquids to be filtered into the container.

A still further object is to provide a filter which retains only a very small volume of oil therein at any time whereby the cooking liquids are not unduly cooled in their passage to the filter.

Additional objects and advantages of the invention will be readily apparent from the reading of the following description of devices constructed in accordance with the invention, and reference to the accompanying drawings thereof, wherein.

Figure 1:
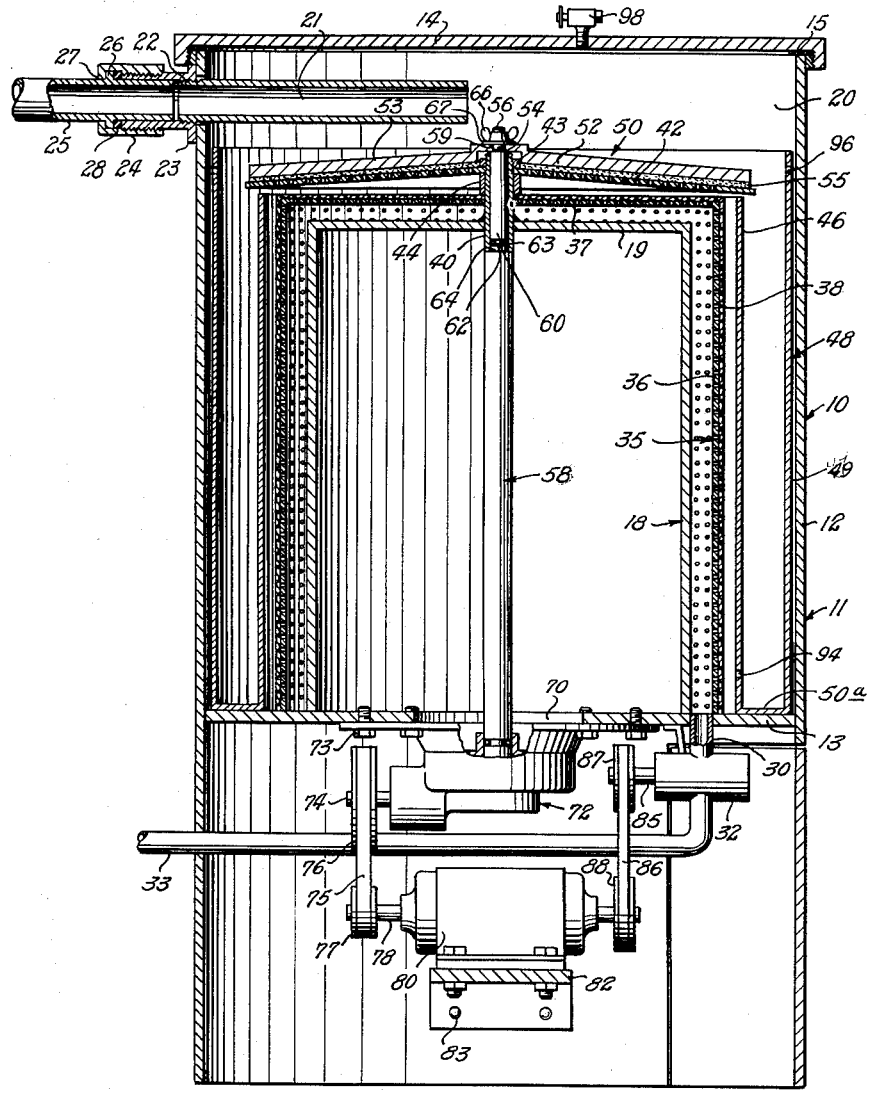
FIGURE 1 is a vertical sectional view of the filter system for filtering the cooking liquids of a deep fryer kettle.
Figure 2:
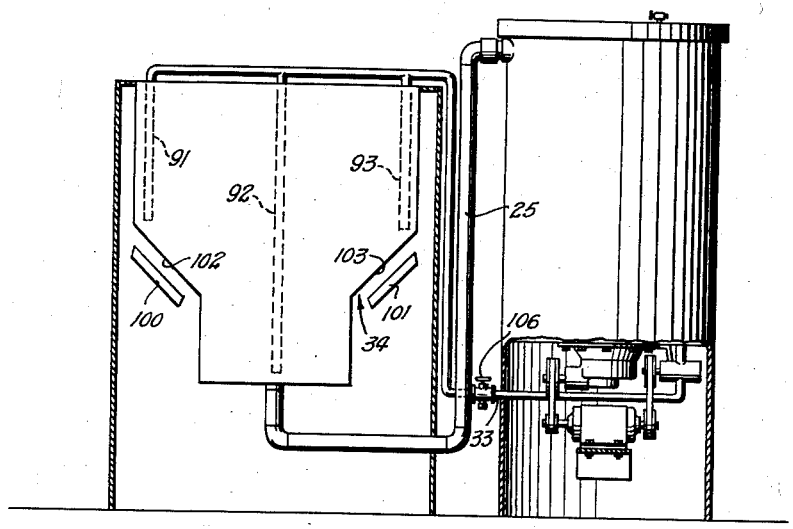
FIGURE 2 is a partly sectional, schematic view of the filter system employing the filter illustrated in FIGURE 1 for filtering the cooking liquids to a deep fryer kettle.

Referring now particularly to FIGURE 1 of the drawings, the filter 10 includes a container 11 having a cylindrical vertical wall or shell 12 provided intermediate its ends with a bottom wall 13 rigidly secured and hermetically sealed to the cylindrical wall 12 by any suitable means, such as welding. The upper end of the cylindrical shell 12 is closed by a removable cover 14 which is threaded on the upper end thereof. A resilient gasket 15 is interposed between the cover 14 and the upper end of the cylindrical shell 12 to seal therebetween. A cylindrical baffle 18 is disposed concentrically inwardly of the shell 12 and its lower end is rigidly secured to the bottom wall 13, as by welding. The cylindrical baffle 18 is provided with a top wall 19. The bottom wall 13, the cylindrical shell 12, the cover 14 and the baffle 18 define a hermetically sealed chamber 20 into which the cooking liquids or other liquid to be filtered is introduced by means of the inlet duct 21.

The inlet conduit 21 extends inwardly through a lateral port or opening in the shell 12 adjacent the top thereof and is provided with quick disconnect threads 22 which engage similar threads on a coupling 23 secured to the exterior of the shell, as by welding. A collar 24 is rotatably mounted on the duct 25 which is provided with an external flange 26. The internally extending flange 27 of the collar 24 engages the external annular flange 26 of the duct and thereby holds the duct 25 connected to the collar. A gasket or seal 28 interposed between the external flange 26 and the outer end of the collar 23 prevents leakage of fluid or air therebetween.

The bottom wall 13 is provided with an outlet conduit 30 which communicates with the chamber 20 extending thereinto through a suitable aperture in the bottom wall. The outlet conduit may be secured to the bottom wall by welding or in any other suitable manner. A pump 32 has its inlet connected to the outlet conduit 30 and its outlet duct 33 extends into the deep fryer kettle 34. The pump 32 is of a type suitable to pump either liquids or gases or a combination of liquids and gases so that if a chamber 20 is empty of liquids the pump 32 will evacuate the chamber 20 of air creating a pressure differential whereby air or liquids are drawn through the inlet duct 21 and the duct 25 into the interior chamber 20.

A filter element 35 is positioned over the baffle shell 18 outwardly of the outlet conduit 30 so that the liquid introduced into the chamber 20 through the inlet conduit 21 must pass through the filter element 35 before reaching the outlet conduit 30. The filter element 35 preferably consists of a cylindrical inner metallic perforate shell 36 having an annular top 37 and covered by a similarly shaped filter cloth 38.

The top wall 19 of the baffle shell and the top wall 37 of the filter element shell 36 are provided with aligned apertures through which a sleeve 40 extends. The sleeve 40 is rigidly secured to the top wall 19, as by welding, and is provided at its upper ends with threads whereby a perforate receiving or separator plate 42 may be rigidly but removably held on the top 37 of the filter shell 36 by a nut 43. The receiving plate 42 is provided adjacent its center with a spacer sleeve or hub 44 which is secured to the receiving plate 42 in any suitable manner, as by welding.

The receiver plate 42 is slightly conical in shape extending downwardly and outwardly from the sleeve 40 over the filter element 35 past the inner cylindrical wall 46 of a food particle and debris receptacle 48 removably disposed in the chamber 20. The debris receptacle 48 is provided with an annular outer wall 49 whose lower end is connected to the inner wall 46 by a bottom 50a. The outer cylindrical wall 49 extends upwardly past the upper end of the inner cylindrical wall 46 and the receiving plate 42 so that any debris carried by the liquid drawn into the container chamber 20 through the inlet duct 21 will fall upon the receiving plate and then roll or fall from the receiving plate into the receptacle 48, the receiving plate extending outwardly over the inner wall 46 so that its outer peripheral annular edge is disposed between the inner and outer walls of the receptacle 48.

A wiper blade 50 is rotatable over the upper surface of the receiving plate to help move the debris and food particles from the receiving plate into the debris receptacle and also to assist in the flow of the oils through the very fine perforations in the perforate receiving plate 42. The wiper 50 includes a pair of blades 52 and 53 which extend outwardly in opposite directions from a hub 54 integral therewith. The blades 52 and 53 are provided on their lower sides with a suitable wiper cloth 55 secured thereto by a suitable means, as by an adhesive.

The hub 54 of the wiper 50 is provided with an aperture through which the reduced threaded end portion 56 of a shaft 58 extends, the hub 54 resting on the annular shoulder 59 of the shaft. An intermediate portion 60 of the shaft 58 extends through the sleeve 40 and is provided with an annular recess 62 in which is disposed an O-ring or sealing means 63 which seals between the sleeve 40 and the intermediate portion 60 of the shaft 58. The intermediate portion 60 of the shaft 58 is of smaller diameter than the main portion of the shaft 58 whereby an annular stop shoulder 64 is provided which limits upper movement of the shaft 58. The wiper 50 is retained on the shaft 58 by a wing nut 66 threaded on the reduced end portion 56 of the shaft 58 and a washer 67.

The shaft 58 extends upwardly through a central aperture 70 of the bottom wall 13 from a speed reducing mechanism 72 of any suitable type which is secured to the bottom wall 13 by bolts 73. The speed reducing mechanism 72 has a driving shaft 74 which is connected by a belt 75 and pulleys 76 and 77 to the drive shaft 78 of an electric motor 80 mounted below the bottom wall 13 on a shelf 82 which extends transversely through the cylindrical shell 12 and is secured to opposite sides thereof by bolts 83. The shaft 85 of the pump 32 is similarly connected to the other end of the drive shaft 78 of the motor 80 by a belt 86 and pulleys 87 and 88. It will thus be seen that when the electric motor 80 is energized, the shaft 85 of pump 32 will be rotated at a speed faster than that of the drive shaft 78 since the pulley 87 is of smaller diameter than the pulley 88 and that the shaft 58 will be rotated at a much slower speed than the drive shaft 78 since the pulley 77 is smaller than the pulley 76 and the speed reducing mechanism 72 reduces the speed of the shaft 58 as compared to the speed of rotation of the drive shaft 74 thereof.

In operation, when the motor 80 is energized the pump pumps air from the chamber 20 of the filter 10 reducing the pressure therein and causing cooking oil or liquids to be drawn from the bottom of the deep fryer kettle 34 through the conduit 25. The liquids as they leave the inner end of the inlet conduit 21 fall upon the receiving or separator plate 42 and flow downwardly through the perforations thereof onto the top of the filter element or inwardly of the inner cylindrical wall 46 of the debris receptacle 48. Any debris carried by such liquids is deposited on the receiving plate and tends to roll downwardly on its outwardly and downwardly sloping upper surface and off the outer edge which extends outwardly of the inner cylindrical wall 46 of the receptacle into the receptacle. Simultaneously the wiper 50 is rotated over the receiving plate and tends to brush off any of the particles which might otherwise tend to adhere to the receiving plate and cause them also to roll down the receiving plate into the debris receptacle 48. The wiper 50 also tends to break down the surface tension of any droplets of cooking liquids which might otherwise tend to roll down the receiving plate rather than flowing through the perforations of the receiving plate. The cooking liquids are then drawn through the filter cloth 38 of the filter element 35 and through the perforations in the perforated metal shell 36 and top 37 into the space between the filter element 35 and the baffle shell 18 and thence to the outlet duct 30 and through the pump into the outlet conduit 33. The outlet conduit 33 is provided with branch pipes 91, 92 and 93 which extend downwardly into the kettle 34 so that the oil pumped into the outlet conduit 33 is delivered or recirculated back into the fryer kettle.

The inlet conduit 21 of the filter 10 is disposed above the upper end of the fryer kettle 34 so that cooking liquids will not flow into the chamber 20 by gravity and can be drawn into the chamber 20 from the duct 25 and kettle 34 only when the pump 32 is in operation. The container 20 is never completely filled with cooking liquids since even during operation of its pump it collects only to a very small depth, say a quarter of an inch, on the bottom wall 50a exteriorly of the baffle shell 18. The inner cylindrical wall 46 of the debris receptacle 48 is provided with a plurality of lateral ports 94 which permit excess cooking liquids which may drain from the food particles deposited in the receptacle to drain into the outlet conduit 30. Since the cooking liquids level in the container chamber 20 never reaches the height of the ports 94, the food particles and debris once deposited in the receptacle 48 are never again contacted by the cooking liquids as they flow or recirculate through the filter 10.

It will now be seen that a new and improved filter 10 has been illustrated and described which draws cooking liquids from a deep fryer kettle 34 onto a receiving or separator plate 42 disposed over a filter element 35 whereby the food particles and debris carried by the oil are separated therefrom and deposited in a debris collecting receptacle 48 prior to passing to the filter element 35 which removes any very fine particles which may have passed through the perforations in the receiving plate. Such debris also is thus prevented from clogging the filter element 35 whose operational life between cleanings or replacements is thus greatly prolonged. It will also be seen that the filter 10 includes a wiper 50 which continuously moves over the receiving plate, whenever the pump 32 is in operation and the cooking liquids are being recirculated through the filter 10, to brush or move the food particles and debris from the receiving plate 42 into the debris collecting receptacle 48. It will be further seen that the food particles and debris once removed from the cooking liquids being recirculated through the filter are kept out of contact with the cooking liquids so that they are no longer subjected to the cooking action of the oil and do not release odors and impart an undesirable taste to the cooking liquids to thus greatly prolong the life of the cooking liquids.

The debris receptacle 48 is also provided with apertures 96 adjacent its upper ends which are adapted to receive the ends of a bail, not shown, by means of which the receptacle may be removed from the container to be emptied of the debris. Removal of the receptacle 48 is accomplished by opening a relief valve 98 in the cover 14 which allows entry of air into the container 20 and thus equalizes the pressure to facilitate rotation and removal of the container cover 14. The inlet conduit is then rotated to disengage its threads 22 from the coupling 23 so that it may be moved outwardly from over the receiving plate. The wing nut 66 is then unscrewed from the shaft 58 to permit removal of the wiper 50 and the receiving plate. The debris receptacle 48 may then be moved upwardly out of the chamber 20 and its contents dumped. The receptacle may then again be placed in position in the chamber 20 and the other elements again assembled in a proper relation whereupon the cover 14 is again screwed on the shell 12 and the relief valve 98 closed thus placing the filter again in condition for operation.

The deep fryer kettle 34 is of the usual configuration and is provided with a pair of gas burners 100 and 101 which heat the inwardly and downwardly inclined surfaces 102 and 103, respectively, of the kettle. The branch pipes 91 and 93 of the outlet conduit 33 of the pump 32 are disposed immediately above these heated surfaces 102 and 103 of the kettle so that the recirculated or pumped cooking liquids flowing from the ends of these branch pipes impinge directly upon these heated surfaces and tend to prevent adherence of food particles to these heated surfaces. The end of the branch pipe 92 extends almost to the bottom of the fryer kettle but is positioned at a point remote from the point at which the conduit 25 communicates with the interior of the kettle so that no direct flow of oil from the pipe 92 directly into the conduit 25 can take place.

The outlet conduit 33 of the pump 32 is provided with a drain valve 106 whereby the cooking liquids may be drained into suitable receptacles for storage in refrigerated areas whenever the fryer is not to be in operation for any considerable length of time, such as overnight. To drain the kettle of the cooking liquids, the pump is placed in operation and the drain valve 106 opened.

The cooking liquids are then drawn from the bottom of the fryer 34, circulated through the filter 10 whereby they are freed from all food particles and debris and then flow through the drain valve 106 into the suitable storage receptacle. The operation of the pump is continued until all of the cooking liquids are drained into the storage receptacle leaving both the fryer kettle 34 and the chamber 20 free of the cooking liquids so that no cooking liquids are ever allowed to congeal in the pump, in the filter or in the kettle.

It will now be seen that a new and improved filter system for filtering cooking liquids, such as oils, greases or fats, has been illustrated and described which continuously circulates the cooking liquids through the filter to remove food particles and debris from such cooking liquids and deposit them in a suitable debris receptacle 48 where they are kept out of contact with the recirculating cooking liquids whereby they cannot impart undesirable tastes or odors to the cooking liquids. It will further be seen that the pump 32 which recirculates the cooking liquids is also employed to drain the fryer of the cooking liquids and transport them to a suitable storage receptacle by the provision of the valve 106 in the outlet conduit of the pump. It will further be seen that the chamber 20 of the filter 10 at any one time contains only a very small amount of cooking liquids since the inlet conduit 21 is disposed above the level of the cooking liquids in the fryer kettle, liquids being drawn into the container 20 only when the pump 32 is in operation reducing the pressure in the container 20 so that atmospheric pressure acting on the surface of the cooking liquids in the open topped fryer kettle 34 forces the cooking liquids from the bottom of the fryer into the upper end of the filter chamber 20. It will further be seen that the liquids are drawn from the bottom of the fryer kettle so that the food particles and debris which tend to collect on the bottom of the kettle are transported by the cooking liquids into the filter 10 to be separated therein from the cooking liquids.

Figure 3:
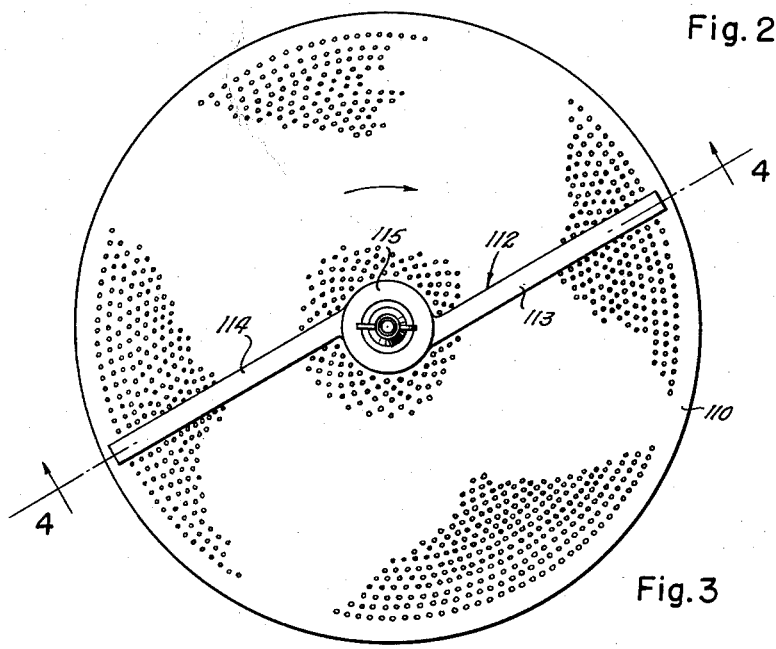
FIGURE 3 is a top view of a modified form of the receiving plate and wiper blade of the filter shown in FIGURE 1.
Figure 4:
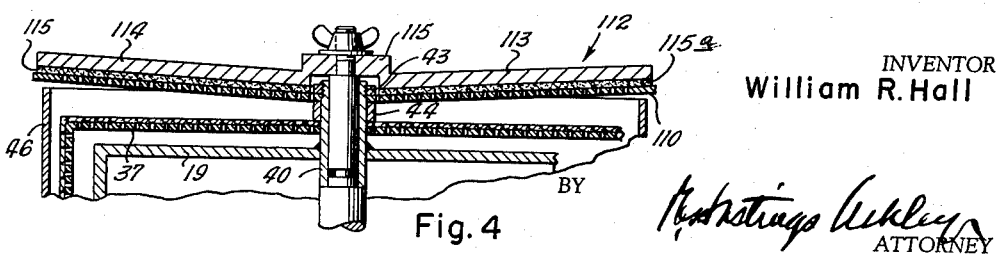
FIGURE 4 is a sectional view taken on line 4—4 of FIGURE 3.

FIGURES 3 and 4 illustrate another embodiment of the receiving plate and wiper shown in FIGURE 1. The receiving plate 110 is similar in all respects to the receiving plate 42 except that it extends outwardly and upwardly from its center. This construction prevents the flow of cooking liquids off the end of the receiving plate into the debris receptacle 48 which may occur to some slight degree with a downwardly and outwardly sloping receiving plate such as the receiving plate 42 of FIGURE 1. Since such downward and inward slope of the receiving plate would tend to cause the food particles to roll inwardly and remain upon the receiving plate to be subjected to the cooking action of the hot liquids passing thereover, the wiper 112 is provided with blades 113 and 114 which are offset from the center of the hub 115 to which they are attached so that rotation of the wiper 112 in the direction indicated by the arrow in FIGURE 3 tends to cause particles of food and debris to be rolled outwardly and upwardly on the receiving plate off the outer edge thereof. The blades 113 and 114 are provided with wiper cloths 115a which are secured to the underside thereof by any suitable means and contact the receiving plate.

Figure 5:
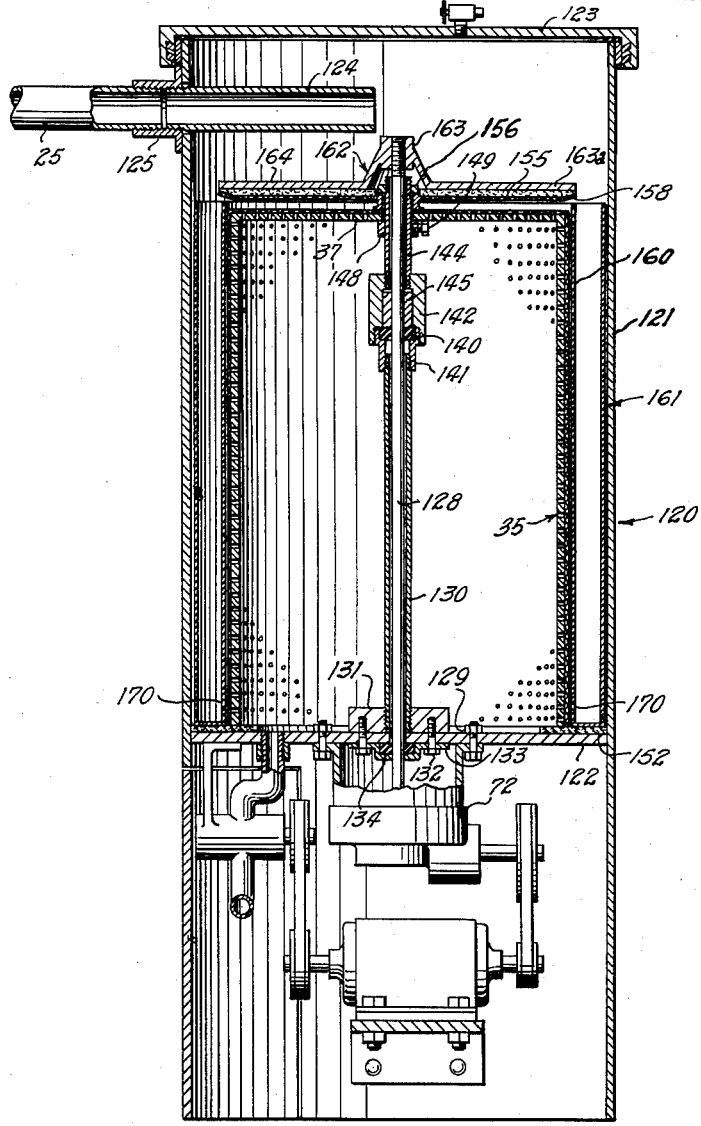
FIGURE 5 is a sectional view of a modified form of the filter shown in FIGURE 1.

In FIGURE 5 is illustrated a modified form of the filter shown in FIGURE 1. The filter 120 includes a cylindrical shell 121 having a bottom wall 122 and a cover 123 removably positioned on the upper end of the cylindrical shell 121. The inlet conduit 124 is connected by suitable threads to a threaded coupling 125 rigidly secured to the exterior of the shell 121 by any suitable means such as welding. The inlet duct 124 is removable inwardly into the shell 121 by rotation thereof to disengage it from the coupling 125. The conduit 25 from the fryer kettle is also threaded into the coupling 125.

The wiper drive shaft 128 extends upwardly from the speed changing mechanism 72 through a suitable aperture 129 in the bottom wall 122 through a center sleeve 130 which is rigidly secured to the bottom wall 122 by means of a mounting base 131. The sleeve 130 is threaded into the mounting base 131 which is rigidly secured to the bottom wall 122 by bolts 132. The bolts 132 also secure a seal retainer ring 133 to the bottom wall which holds an O-ring or seal means 134 in place sealing between the bottom wall and the shaft 128. A second O-ring or seal means 140 seals between the bushing retainer 141 threaded on the upper end of the sleeve 130 and the shaft 128. The bushing retainer includes an upper section 142 threaded on the upper enlarged portion of the lower bushing retainer section 141. The upper sleeve 144 is in turn threaded into the upper bushing retainer section 142 and extends upwardly through the top wall 37 of the filter element 35. The bushing retainer 142 holds a bushing 145 which steadies and helps position the shaft 128 in the sleeve 130. Thus the center sleeve 130, the bushing retainer 141 and 142, and the upper sleeve 144 form a sealed guide post for the wiper drive shaft 128.

An adjustable collar or stop 148 is slidably positioned on the upper sleeve 144 and is provided with a set screw 149 by means of which it is rigidly secured to the sleeve 144 in any adjusted position. The adjustable stop 148 supports the top wall 37 of the filter 35 in a suitable vertical position relative to the center sleeve 130. The lower edge of the filter element 35 rests upon an asbestos fiber gasket 152 which prevents flow of cooking liquids beneath the lower end of the filter element 35.

The perforate receiving plate 155 is held in position over the filter element 35 by a nut 156 threaded on the upper end of the sleeve 144. The receiving plate 155 is of substantially horizontal shape and has an outer annular lip 158 which extends upwardly and outwardly over the inner wall 160 of a debris and food particle receiving receptacle 161. A wiper 162 is disposed over the receiving plate and includes a central ring or hub 163 threaded on the upper end of the shaft 128 and a pair of blades 163a and 164 extending in opposite directions from the hub 163. The blades 163a and 164 are preferably provided with cloth on their lower surfaces which contacts the upper surface of the receiving plate. The blades are preferably offset from the center of the hub 163 in a manner somewhat similar to that of the blades 113 and 114 shown in FIGURE 3 so that the blades will tend to roll or move the food particles or debris deposited on the receiving plate outwardly and over the outer edge of the receiving plate into the debris receiving receptacle 161. The debris receiving receptacle 161 is provided with perforations 170 on its inner wall 160 which provide for drainage of the cooking liquids from the debris deposited within the receptacle.

It will be apparent that the filter 120 illustrated in FIGURE 5 operates in exactly the same manner as the filter 10 shown in FIGURE 1 except that the baffle 18 which reduces the volume of the chamber 20 of the filter 10 is not present. The mode of operation of the filter 120 is exactly the same as the mode of operation of the filter 10 and will not therefore be described.

When the filter 10 has been shown as supported by an extension of the cylinder defining the chamber 20, it will be apparent that such downward extension can be replaced by suitable legs.

The following description of the invention is explanatory only, and changes in the details of the construction illustrated may be made by those skilled in the art, within the scope of the appended claims, without departing from the spirit of the invention.

What is claimed and desired to be secured by Letters Patent is:

1. A filter system for a frying kettle comprising: a closed chamber having an inlet at its upper end and an outlet at its lower end; means for connecting the inlet to the lower portion of the kettle, said inlet being disposed above the upper level of the liquid in the kettle; pump means connected to the outlet of the chamber for reducing the pressure within the chamber whereby liquid may be drawn from the kettle through the inlet into the chamber, said pump means being adapted to discharge fluids from the chamber back into the kettle; filter means in the chamber interposed between the inlet and the outlet; a receptacle disposed in said container; and means in said chamber below said inlet and between said filter means and said inlet for separating large particles of foreign matter from the liquids drawn through the inlet and depositing said foreign matter in said receptacle out of contact with liquids being circulated through the chamber from the inlet to the outlet thereof.

2. A filter system for a frying kettle comprising: a closed chamber having an inlet at its upper end and an outlet at its lower end; means for connecting the inlet to the lower portion of the kettle, said inlet being disposed above the upper level of the liquid in the kettle; pump means connected to the outlet of the chamber for reducing the pressure within the container whereby liquid may be drawn from the kettle through the inlet into the chamber, said pump means being adapted to discharge fluids from the chamber back into the kettle; filter means in the chamber interposed between the inlet and the outlet; a receptacle disposed in said container; and means in said chamber below said inlet and between said inlet and said filter means for separating large particles of foreign matter from the liquids drawn through the inlet and depositing said foreign matter in said receptacle out of contact with liquids being circulated through the container from the inlet to the outlet thereof, said separating means including a perforate receiving plate on which the fluids from the inlet are discharged and a wiper blade movable over said receiving plate to brush the particles of foreign matter into the receptacle, said receiving plate being perforated and having outer edges extending over said receptacle, said liquids draining through said perforations, said food particles dropping over the edge of the receiving plate into the receptacle.

3. A filter comprising: a closed container having inlet duct extending inwardly into the said container and adapted to be connected to a reservoir of liquid which is to be filtered; said container having an outlet connected to a pump means for pumping fluids from the container at the bottom thereof; a filter element interposed between said inlet and said outlet; a receiving plate mounted over said filter element between said inlet conduit and said filter element, said receiving plate being perforate whereby liquid drawn through the inlet conduit falling upon the receiving plate flows through said perforate plate onto said filter element; and a debris collecting receptacle disposed outwardly of said filter element in said container for receiving debris deposited on said receptacle by fluid drawn from the inlet conduit, said receiving plate extending outwardly over the upper end of said receptacle whereby debris deposited on said receiving plate falls off the receiving plate into the said receptacle.

4. A filter comprising: a closed container having inlet duct extending inwardly into the said container and adapted to be connected to a reservoir of liquid which is to be filtered, said container having an outlet connected to a pump means for pumping fluids from the container at the bottom thereof; a filter element interposed between said inlet and said outlet; a receiving plate mounted over said filter element between said inlet conduit and said filter element, said receiving plate being perforate whereby liquid drawn through the inlet conduit falling upon the receiving plate flows through said perforate plate onto said filter element; a debris collecting receptacle disposed outwardly of said filter element in said container for receiving debris deposited on said receptacle by fluid drawn from the inlet conduit, said receiving plate extending outwardly over the upper end of said receptacle whereby debris deposited on said receiving plate falls off the receiving plate into the said receptacle; and wiper means movably mounted over said receiving plate for wiping said receiving plate to move said debris into said receptacle, said receiving plate extending downwardly and outwardly in all directions toward said debris receptacle.

5. A filter comprising: a closed container having inlet duct extending inwardly into the said container and adapted to be connected to a reservoir of liquid which is to be filtered, said container having an outlet connected to a pump means for pumping fluids from the container at the bottom thereof; a filter element interposed between said inlet and said outlet; a receiving plate mounted over said filter element between said inlet conduit and said filter element, said receiving plate being perforate whereby liquid drawn through the inlet conduit falling upon the receiving plate flows through said perforate plate onto said filter element; a debris collecting receptacle disposed outwardly of said filter element in said container for receiving debris deposited on said receptacle by fluid drawn from the inlet conduit, said receiving plate extending outwardly over the upper end of said receptacle whereby debris deposited on said receiving plate falls off the receiving plate into the said receptacle; and wiper means movably mounted over said receiving plate for wiping said receiving plate to move said debris into said receptacle, said receiving plate being substantially horizontal and having an annular outer peripheral portion extending outwardly and upwardly over said debris collecting receptacle.

6. A filter comprising: a closed container having inlet duct extending inwardly into the said container and adapted to be connected to a reservoir of liquid which is to be filtered, said container having an outlet connected to a pump means for pumping fluids from the container at the bottom thereof; a filter element interposed between said inlet and said outlet; a receiving plate mounted over said filter element between said inlet conduit and said filter element, said receiving plate being perforate whereby liquid drawn through the inlet conduit falling upon the receiving plate flows through said perforate plate onto said filter element; a debris collecting receptacle disposed outwardly of said filter element in said container for receiving debris deposited on said receptacle by fluid drawn from the inlet conduit, said receiving plate extending outwardly over the upper end of said receptacle whereby debris deposited on said receiving plate falls off the receiving plate into the said receptacle; wiper means movably mounted over said receiving plate for wiping said receiving plate to move said debris into said receptacle; and a baffle in the container for reducing the volume of the container, said baffle and said filter element being disposed on opposite sides of said outlet.

7. A filter comprising: a closed container having inlet duct extending inwardly into the said container and adapted to be connected to a reservoir of liquid which is to be filtered, said container having an outlet connected to a pump means for pumping fluids from the container at the bottom thereof; a filter element interposed between said inlet and said outlet; a receiving plate mounted over said filter element between said inlet conduit and said filter element, said receiving plate being perforate whereby liquid drawn through the inlet conduit falling upon the receiving plate flows through said perforate plate onto said filter element; a debris collecting receptacle disposed outwardly of said filter element in said container for receiving debris deposited on said receptacle by fluid drawn from the inlet conduit, said receiving plate extending outwardly over the upper end of said receptacle whereby debris deposited on said receiving plate falls off the receiving plate into the said receptacle; wiper means movably mounted over said receiving plate for wiping said receiving plate to move said debris into said receptacle; and means for simultaneously operating said wiper means and said pump means.

8. A filter system for a frying kettle comprising: a closed chamber having an inlet at its upper end and an outlet at its lower end; means connecting the inlet to the lower portion of the kettle, said connecting means and said inlet being disposed to prevent gravity flow of fluid from said inlet of the chamber to the kettle; pump means connected to the outlet of the chamber for reducing the pressure within the chamber whereby liquid may be drawn from the kettle through the inlet into the chamber, said pump means having means for discharging fluids from the chamber back into the kettle; filter means in the chamber interposed between the inlet and the outlet, said pump being operable continuously during use of the kettle in frying operations to continuously withdraw liquid from the lower portion of the kettle into the chamber and to discharge liquid from the chamber back to the kettle; a receptacle disposed in said chamber; and means in said chamber below said inlet and between said filter means and said inlet for separating large particles of foreign matter from the liquids drawn through the inlet and depositing said foreign matter in said receptacle out of contact with liquids being circulated through the chamber from the inlet to the outlet thereof.

References Cited in the file of this patent

UNITED STATES PATENTS

| | | |
|---|---|---|
| 1,065,821 | Mandel | June 24, 1913 |
| 1,328,853 | Steward | Jan. 27, 1920 |
| 1,335,087 | Bell | Mar. 30, 1920 |
| 1,472,896 | Alsop | Nov. 6, 1923 |
| 1,739,559 | Owens | Dec. 17, 1929 |
| 2,089,702 | Lomax | Aug. 10, 1937 |
| 2,514,471 | Calhoun | July 11, 1950 |
| 2,636,612 | Cording | Apr. 28, 1953 |
| 2,705,563 | Ide | Apr. 5, 1955 |
| 2,760,645 | Mies | Aug. 28, 1956 |

FOREIGN PATENTS

| | | |
|---|---|---|
| 402,517 | France | Aug. 31, 1909 |